N. Waterman,
Water Filter.

Nº 13,054.  Patented June 12, 1855.

UNITED STATES PATENT OFFICE.

NATHANIEL WATERMAN, OF BOSTON, MASSACHUSETTS.

PORTABLE FLOATING FILTER.

Specification of Letters Patent No. 13,054, dated June 12, 1855.

*To all whom it may concern:*

Be it known that I, NATHANIEL WATERMAN, of Boston, in the county of Suffolk and State of Massachusetts, have invented certain new and useful Improvements in Portable Floating Water-Filters; and I do hereby declare the following to be a full, clear, and exact description of the same, reference being had to the accompanying drawings, making a part thereof, in which—

Figure 1:
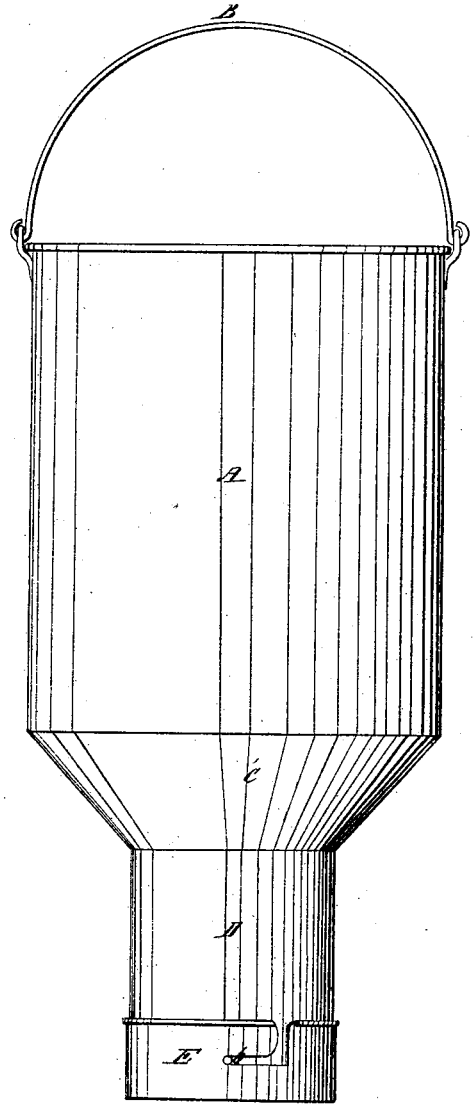
Figure 2:
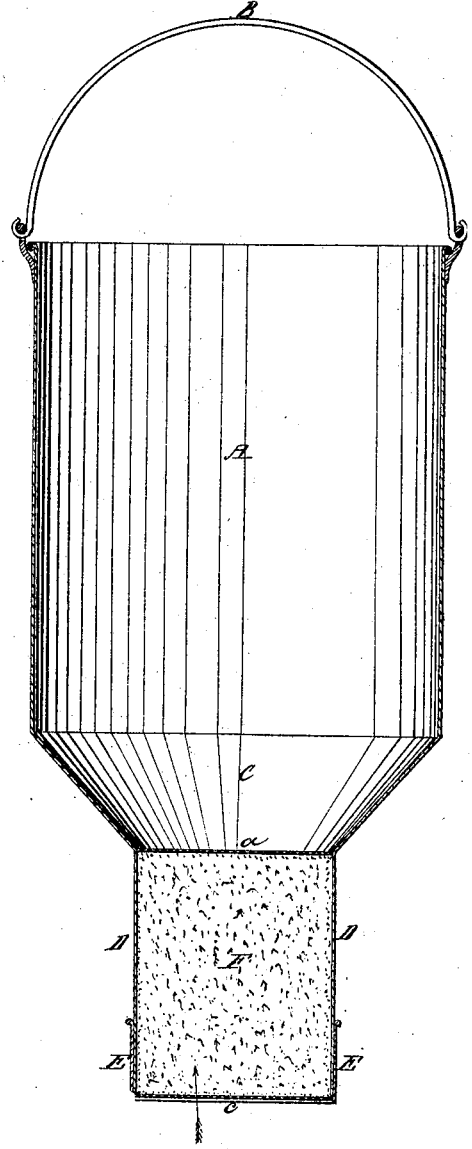

Figure 1 represents a side elevation, and Fig. 2, represents, a vertical section through the same.

Similar letters where they occur in both the figures denote like parts.

The nature of my invention consists in making a filter into which the water enters always under a uniform pressure, so that there is always the same degree of filtration going on, without the slightest variation, whether said filter is more or less full of water.

My filter is of the most simple kind, and of a portable character, and may be made of tin, or tinned or silvered copper, as may be desired. It is composed of a cylinder A, open at its upper end, and provided for convenience of carrying with a bail B. The bottom is formed of an inverted frustum of a cone C, which materially contracts it, and is covered with a finely perforated piece of metal, or of woven or reticulated wire gauze *a*. Below this is another though much smaller cylinder D, which has a cap E, fitting over it, with a bayonet fastening *b*, to hold it in place, and the lower end of the cap E, is covered with a perforated plate, or fine woven wire gauze *c*. The space between *a*, and *c*, is filled with fine sand, pounded quartz, or any other good filtrating substance F which completes the filter.

To use the filter above described, it is set into the water which is to be filtered, and by its weight slightly sinks in the water, and thus floats, the water passing from the outside through the gauze or plate *c*, the filtering material F, and the gauze or plate *a*, into the inside of the filter, from whence clean, pure water may be drawn or dipped. The pressure of the water on the filter is always uniform, and consequently there is no variation of the amount of water which is passing into it, as the difference between the outside and inside surfaces of the water do not vary although the filter itself may be more or less full of water. This is not the case in any other filtering apparatus of which I have any knowledge. There the pressure is constantly varying with the height or volume of the water, and when fresh filled the water is forced through much more rapidly than afterward. I have never, previous to my own filter, known of one which did not require to have the water furnished to it, by pipes, buckets, or some other contrivance. My filter is simply set in the water, whether in a tub, barrel, cask, pond or river, and the water filters into it, while it floats about. When the filter is used for a more permanent purpose, an air chamber may surround its upper end, beyond which it could not sink, or other buoyant matter or substance may be used; as a common hand filter this would not be required, and they may be made large enough to contain a hose or pipe, through which the water could be raised by a pump. When the filtering material becomes foul, the cap is removed and fresh material supplied there being nothing about it which would require a mechanic or expert to use or repair it. When cleaned out the whole of the filtering material is not lost, for the water does not pass through it under pressure, and consequently leaves the impurities near the surface of the material. The filter shows for itself, when it is foul, as the water will not pass into it, and its cleansing is but a momentary operation, by simply reversing the filter and removing the cap, and taking out the foul matter and replacing it by clean sand, or other material.

Having thus fully described the nature of my invention what I claim therein as new, and desire to secure by Letters Patent is—

A portable floating water filter substantially such as described, wherein the water is filtered from the outside into the inside under a uniform pressure regardless of the quantity of water in the filter, as set forth.

NATH. WATERMAN.

Witnesses:
WM. G. RUSSELL,
WM. HEDGE.